United States Patent [19]

Shimada et al.

[11] Patent Number: 5,087,518

[45] Date of Patent: Feb. 11, 1992

[54] GLASS FLAKE COMPOSITE

[75] Inventors: Shigeki Shimada; Hidekazu Tanaka; Tsunefumi Nakagawa, all of Mie, Japan

[73] Assignee: Nippon Glass Fiber Co., Ltd., Tsu, Japan

[21] Appl. No.: 608,394

[22] Filed: Nov. 2, 1990

Related U.S. Application Data

[62] Division of Ser. No. 220,033, Jul. 15, 1988, Pat. No. 5,002,827.

[30] Foreign Application Priority Data

Oct. 26, 1987 [JP] Japan .................. 62-269828
May 18, 1988 [JP] Japan .................. 63-121076

[51] Int. Cl.$^5$ ............................................. B29C 67/02
[52] U.S. Cl. ................................. 428/372; 428/325; 428/406; 428/407; 428/375; 428/391; 428/401; 65/21.1; 65/27; 523/220; 523/513; 523/527; 524/494

[58] Field of Search ............ 428/325, 402, 404, 406, 428/407, 426, 372, 375, 391, 401; 65/21.1, 27, 60.3; 264/109, 117, 122; 523/220, 440, 513, 527; 524/494

[56] References Cited

U.S. PATENT DOCUMENTS

| | | | |
|---|---|---|---|
| 3,607,825 | 9/1971 | Shannon | 106/688 |
| 3,894,882 | 7/1975 | Takewell et al. | 65/27 X |
| 3,920,879 | 11/1975 | Segal et al. | 428/474.9 |
| 4,086,098 | 4/1978 | Le Ruyet et al. | 106/97 |
| 4,347,073 | 8/1982 | Auborg et al. | 65/28 |
| 4,501,773 | 2/1985 | Nioh et al. | 427/213 |
| 4,846,409 | 7/1989 | Kaspar et al. | 241/21 |

Primary Examiner—George F. Lesmes
Assistant Examiner—Christopher Brown
Attorney, Agent, or Firm—Kanesaka and Takeuchi

[57] ABSTRACT

Granules of glass flakes which comprise glass flakes in granular form and a binder which bonds the glass flakes to one another to form granules. The granules are used together with a molten thermoplastic resin.

10 Claims, 4 Drawing Sheets

GLASS FLAKE COMPOSITE

This is a division of application Ser. No. 220,033, filed July 15, 1988, now U.S. Pat. No. 5,002,827.

FIELD OF THE INVENTION AND RELATED ART STATEMENT

The present invention relates to glass flakes and a glass flake composite. More particularly, it is concerned with glass flakes in granular form and a glass flake composite which have free-flowing properties and yet do not scatter when unpacked and find use as a reinforcement for composite materials having improved characteristic properties (such as strength).

Glass flakes and glass chopped strands are in practice used as reinforcing materials for thermoplastic resins and thermosetting resins.

Glass flakes are flaky glass pieces having an aspect ratio (particle diameter to thickness) of about 2 to 1000. They have found general use as a reinforcing material for thermoplastic resins and thermosetting resins and also as a filler for corrosion-resistant lining.

For example, a thermosetting resin incorporated with glass flakes may be used as a corrosion-resistant lining. When it is applied to a metal surface by spraying or trowelling, the glass flakes orient in the coating film in the direction parallel to the coating surface. If the amount of the glass flakes is 30 wt% of the resin, the coating film contains about 30 to 40 flakes per millimeter of thickness. The glass flakes arranged in layer cause moisture and oxygen to trace extremely lengthened paths before they reach the surface of the base material. In this way, they prevent corrosion.

Also, a thermoplastic resin incorporated with glass flakes may be used as a reinforced plastic material, which has improved tensile strength, flexural strength, flexural modulus, heat distortion temperature, and dimensional accuracy owing to the two dimensional reinforcing effect of glass flakes. In addition, it has good barrier properties. The resin reinforced with glass flakes provides molded products whose warpage is extremely smaller than those of glass fiber-reinforced resin, because the molding shrinkage in the direction of resin flow is almost equal to that in the direction perpendicular to the resin flow.

In the meantime, glass flakes are packed in drums or multiwall bags (composed of kraft paper and polyvinyl chloride). For mixing with a thermoplastic resin, glass flakes are transferred to a feed hopper of a mixer from the package. During this operation, glass flakes scatter very easily because they are discrete flakes particles with several micrometers in thickness and 10 to 4,000 μm in diameter and they are in a dry state, with a water content less than 0.2 wt %. The scattered glass flakes aggravate the working environment, contaminate the other processes, and decrease the yields. Moreover, they stick to the operator's clothe and they are inhaled by the operator.

Another disadvantage of glass flakes is their poor flowability and hence their tendency toward bridging in the passage from the hopper to the molding machine. Bridging fluctuates the feed rate.

As mentioned above, glass flakes improve the dimensional stability of molded products, whereas chopped strands improve the strength of molded products. Therefore, if both are used, it is possible to obtain molded products superior in both dimensional stability and mechanical properties. (See Japanese Patent Publication No. 17223/1985.) In addition to glass flakes and chopped strands, milled glass fiber is also used as a reinforcing material for synthetic resins.

Heretofore, glass flakes, chopped strands, and milled glass fiber have been available separately but not available in mixed form. Therefore, the user has to feed them separately into an extruder in the mixing step, if it is necessary to use both glass flakes and chopped strands to obtain molded products having improved dimensional stability and mechanical properties.

Consequently, where two kinds of reinforcing materials are used, two feeders are required. This forces the user to double the equipment, expense, and labor required in the case where only one kind of reinforcing material is used.

This is also the case with chopped strands and milled fiber. They easily scatter to aggravate the working environment and lower the yield, and they are liable to cause bridging in the hopper and orifice because of their poor flowability.

OBJECTS AND SUMMARY OF THE INVENTION

The present invention was completed to solve the above-mentioned problems. Accordingly, it is an object of the present invention to provide free-flowing glass flakes in granular form which scatter very little when they are unpacked and transferred to the hopper, said glass flakes being used as a reinforcing material for thermoplastic resins and the like.

It is another object of the present invention to provide a glass flake composite that obviates the necessity of using two or more feeders for two kinds or more of reinforcements (for example, glass flakes and chopped strands).

It is further another object of the present invention to provide a glass flake composite which is composed of glass flakes and chopped strands at any desired ratio.

The glass flakes in granular form of the present invention are composed of glass flakes and a binder which bonds glass flakes to one another to form granules.

The glass flake composite of the present invention is composed of glass flakes and minute glass fiber pieces, with at least a portion of said minute glass fiber pieces being bonded to one another with a binder. (This composite is referred to as glass flake composite A hereinafter.)

The glass flake composite of the present invention is composed of short glass fibers and glass flakes in granular form having a particle size close to that of said short glass fibers. (This composite is referred to as glass flake composite B hereinafter.)

DETAILED DESCRIPTION OF THE PREFERRED EMBODIMENTS

Figure 1:
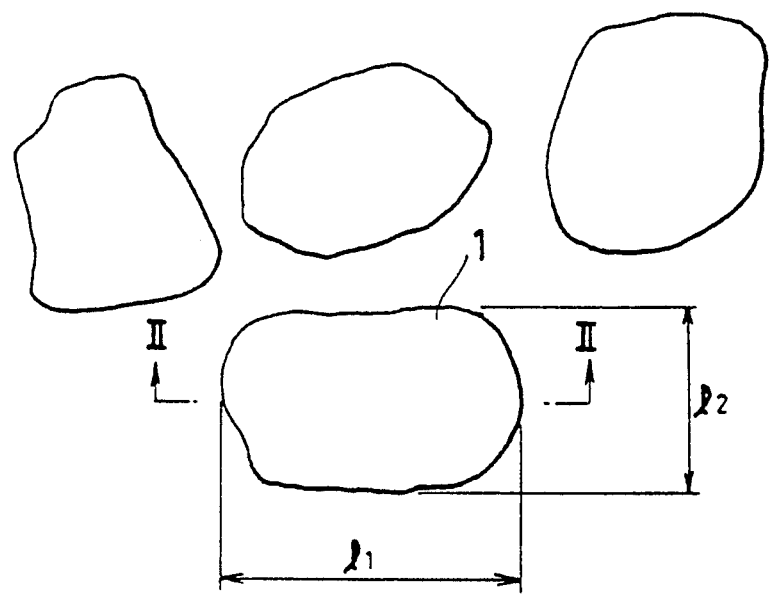
FIG. 1 is an enlarged schematic representation of particles of the glass flakes in granular-form obtained in Example 1.

According to the present invention, the glass flakes in granular form are formed by bonding glass flakes to one another with a binder.

The glass flakes in granular form can be produced from commonly used glass flakes having an average thickness of 0.5 to 7.0 μm, an average particle diameter of 5 to 1,000 μm, and an aspect ratio of 2 to 1,000.

The binder is used in an amount of 0.2 parts by weight or more for 100 parts by weight of glass flakes. This amount is enough to produce the scatter preventing effect. For minimum scattering, the amount of the binder should preferably be 0.5 parts by weight or more. A binder used in excess of 10 parts by weight for 100 parts by weight of glass flakes will prevent glass flakes from dispersing completely into the molten thermoplastic resin and also discolor (or yellow) molded products. Therefore, the amount of the binder should be in the range of 0.5 to 10 parts by weight for 100 parts by weight of glass flakes.

The binder used in the present invention is not specifically limited in its type so long as it is capable of bonding glass flakes to one another. However, it should be selected from those which do not adversely affect the matrix resins into which the glass flakes are incorporated.

Examples of the binder include addition polymers of olefins and copolymers thereof such as polyvinyl acetate, polyacrylate, polyvinyl pyrrolidone, polyethylene, acid-modified polyethylene, polypropylene, and acid-modified polypropylene; polyaddition reaction products such as polyurethane and polyurea; condensation products such as saturated or unsaturated polyester, nylon, and epoxy resin; ring opening polymers such as nylon-6 and polyethyloxazoline; and addition condensates such as urea-formalin resin and phenol-formalin resin.

The binder is used in the following manner to granulate glass flakes.

① The binder is dissolved in a proper organic solvent to give a binder solution. Alternatively, the binder in emulsion form is diluted with a proper amount of water to give a binder solution.

② A prescribed amount of the binder solution (prepared in ①) is added to glass flakes by spraying or the like while keeping glass flakes fluidized in a mixer such as rotary disk type mixer. The binder and glass flakes are stirred and mixed in the mixer.

③ The mixture is dried in the mixer or dried after discharge from the mixer. Thus there are obtained glass flakes in granular form.

④ The glass flakes in granular form obtained in ③ are softly sieved with a punched screen having holes about 1 to 5 mm in diameter or a screening mesh having an opening of about 1 to 5 mm. This step may be omitted.

The thus prepared glass flakes in granular form should have a proper particle size. With an excessively small particle size, the glass flakes are liable to scatter; with an excessively large particle size, the glass flakes do not disperse uniformly into the matrix resin. The preferred particle size is such that the fraction which remains on the 44-μm screen and passes through the 5,000-μm screen accounts for 90 wt % or more. The more desirable particle size is such that the fraction which remains on the 250-μm screen and passes through the 2,000-μm screen accounts for 90 wt % or more.

Each granule of the glass flakes should have such a structure that tens to thousands of glass flakes are laminated on top of the other parallel to each other.

The glass flakes used as a reinforcement for synthetic resins should preferably be surface-treated with a coupling agent for good adhesion to and uniform dispersion into the matrix resin.

The surface treatment may be accomplished prior to the above-mentioned granulation step; but for the reduction of production steps, it is advantageous to add a coupling agent to the binder solution. Thus it is possible to carry out the surface treatment and granulation simultaneously in a single step.

Examples of the coupling agents include silane coupling agents such as γ-aminopropyltrimethoxysilane, γ-aminopropyltriethoxysilane, N-β-aminoethyl-γ-aminopropyltrimethoxysilane, γ-glycidoxypropyltrimethoxysilane, vinyltriethoxysilane, and γ-methacryloxypropyltrimethoxysilane; titanium coupling agents, and zirconium coupling agents.

These coupling agents may be used in combination with an antistatic agent, lubricant, film-forming agent, and the like.

According to the present invention, the glass flake composite is formed by mixing glass flakes with short glass fibers and bonding at least a portion of said minute glass fiber pieces to one another with a binder.

The glass flake composite can be produced from commonly used glass flakes, as mentioned above, having an average thickness of 0.5 to 7.0 μm, an average particle diameter of 5 to 1,000 μm, and an aspect ratio of 2 to 1,000.

The short glass fibers are chopped strands and/or milled glass fibers. The chopped strands are not specifically limited in shape; however, their length should be 6 mm or less, preferably 0.5 to 3 mm. Excessively long ones are liable to bridging in the hopper and are not fed smoothly. The chopped strands are prepared by cutting collected 400 to 5,000 filaments (1 to 3 mm in diameter) to the above-specified length. The milled glass fibers are prepared by crushing commercially available glass strands or scrap thereof using a proper crusher. The fiber length is not necessarily fixed. Commercial products are 10 to 500 μm long. According to the present invention, the preferred fiber length is 20 to 300 μm and the preferred fiber diameter is 4 to 20 μm, particularly 6 to 13 μm.

The mixing ratio of glass flakes and short glass fibers (chopped strands and/or milled glass fibers) is not specifically limited but it is properly determined according to the intended use and the desired quality of molded products. Usually, glass flakes and short glass fibers are mixed at a ratio of 1:99 to 99:1, preferably 20:80 to 80:20 (by weight).

The bonding of the short glass fibers is achieved with a variety of binders which are used for the surface treatment of glass flakes and the production of chopped strands. Examples of the binder include the above-mentioned binders, that is, polyvinyl acetate, polyacrylate, polyurethane, epoxy resins, and copolymers thereof and modified products thereof. The polyurethane-based binder may be of the aromatic or aliphatic isocyanate type and also of the polyester type or polyether type. The epoxy-based binder may be of bisphenol-A type or novolakepoxy type.

The binder is used in an amount of 0.1 to 5 wt % of short glass fibers. With an amount less than 0.1 wt %, the binder is not enough to bond short glass fibers and to provide a uniform mixture. With an amount in excess of 5 wt %, the binder discolors the molded products and reduces the flowability of resin at the time of molding.

The glass flake composite of the present invention is produced by mixing glass flakes and short glass fibers and adding a binder solution to the mixture by spraying or the like, as in the above-mentioned ①  to ③, thereby bonding at least a portion of said short glass fibers to one another.

In the production of glass flake composite A, it is also possible to use the above-mentioned coupling agent, antistatic agent, lubricant, film-forming agent, and the like in combination.

The thus produced glass flake composite should contain particles of 0.5 to 6 mm in diameter which are formed by bonding short glass fibers to one another. With particle diameter greater than 6 mm, the glass flake composite is not readily fed to the molding machine. With a particle diameter smaller than 0.5 mm, the glass flake composite is not uniformly mixed.

The short glass fibers constituting the glass flake composite B may be chopped strands. The chopped strands are not specifically limited in shape; however, their length should be 0.5 to 25 mm. Excessively long ones are liable to bridging in the hopper and are not fed smoothly. The preferred cut length is shorter than 6 mm, particularly 0.5 to 3 mm. The chopped strands are prepared by cutting strands (1 to 3 mm in diameter) of 400 to 5,000 filaments (each 6 to 15 $\mu$m in diameter) to the above-specified length.

The particle size of the chopped strands varies depending on not only the fiber length but also the water content in the binder used at the time of spinning and stranding. With a high water content in the binder, the chopped strands do not easily crush during handling or mixing with glass flakes in granular form. This leads to coarse chopped strands. In the case where a binder incorporated with a thickener is used when chopped strands are produced, the resulting chopped strands are coarse.

The desired particle size of the chopped strand is such that the fraction of 9 to 24 mesh accounts for 50 wt % or more at the time of mixing with glass flakes in granular form.

The glass flakes in granular form which constitute glass flake composite B of the present invention are prepared from the above-mentioned glass flakes in granular form having almost the same particle size distribution as the short glass fibers by granulating them with a binder.

The particle size of the thus produced glass flakes in granular form depends mainly on the particle size of glass flakes (as the raw material), the water content in the binder, and screening. With a high water content in the binder, the glass flakes in granular form have a small particle size (and hence a high density), because glass flakes are firmly bonded to one another although the amount of solids sticking to glass flakes is constant.

The granulation of glass flakes may be accomplished in the same manner as mentioned above. For example, glass flakes are sprayed with a binder solution, followed by thorough mixing and drying.

The application of the binder may be accomplished by dipping glass flakes in a binder solution. In this case, the resulting granules of glass flakes is large, and it is necessary to regulate the particle size.

The thus produced granules of glass flakes should have almost the same particle size as the above-mentioned short glass fibers. In other words, the desired particle size is such that the fraction of 9 to 24 mesh accounts for 50 wt % or more. This is achieved by properly controlling the particle size of glass flakes and the water content in the binder.

The granules of glass flakes are prepared from commercially available glass flakes mentioned above. The binder used for granulation is the same binder as mentioned above.

The amount of the binder should be in the range of 0.2 to 10 parts by weight for 100 parts by weight of glass flakes, depending on the particle size of glass flakes for granulation and the desired particle size of the granules of glass flakes.

With an amount less than 0.2 parts by weight for 100 parts by weight of glass flakes, the binder is insufficient to produce granules of glass flakes. The binder used in excess of 10 parts by weight for 100 parts by weight of glass flakes will prevent glass flakes from dispersing completely into the molten thermoplastic resin and also discolor (or yellow) molded products.

In the production of glass flake composite B, it is also possible to use the above-mentioned coupling agent, etc.

The glass flake composite B of the present invention may be produced by mixing glass flakes in granular form and short glass fibers in any one of the following manners (a), (b), and (c).

(a) Dried glass flakes in granular form are mixed with dried short glass fibers.
(b) Undried glass flakes in granular form are mixed with dried short glass fibers, and the resulting mixture is dried.
(c) Undried glass flakes in granular form are mixed with undried short glass fibers, and the resulting mixture is dried.

During mixing, the mixture may be incorporated, if necessary, with the above-mentioned silane coupling agent, binder, lubricant, etc. in the form of liquid or solid (powder or granules).

The mixing ratio for the chopped strands and glass flakes in granular form is not specifically limited, and it may be properly determined according to the intended use and the desired quality of molded products. Usually, glass flakes and short glass fibers are mixed at a ratio of 1:99 to 99:1, preferably 20:80 to 80:20 (by weight).

There is no specific limitation in glass composition of the glass flakes which constitute the granules of glass flakes and the glass flakes and short glass fibers which constitute the glass flake composites A and B. Usually, they are E-glass (alkali-free silicate glass) or C-glass (alkali-containing silicate glass). The latter is composed of 60~75 wt % cf $SiO_2$, 8~20 wt % of $R_2O$ (alkali metal oxide such as $Na_2O$ and $K_2O$, $SiO_2 + R_2O = 75~90$ wt %), and a small amount of one or more than one component selected from CaO, MgO, $B_2O_3$, $Al_2O_3$, ZnO, and $Fe_2O_3$.

A preferred example of the glass composition is shown in Table 1.

TABLE 1

| Component (wt %) | I*1 | II*2 | III |
| --- | --- | --- | --- |
| SiO$_2$ | 64.6 | 54.2 | 72.6 |
| Al$_2$O$_3$ | 4.1 | 14.8 | 1.7 |
| Fe$_2$O$_3$ | | | 0.1 |
| CaO | 13.4 | 21.1 | 7.3 |
| MgO | 3.3 | 0.3 | 3.9 |
| B$_2$O$_3$ | 4.7 | 9.0 | — |
| Na$_2$O$_3$ | 9.6 | 0.5 | 13.0 |
| K$_2$O | | | 0.9 |
| BaO | 0.9 | 0.3 | — |

*1 C-glass
*2 E-glass

The glass flakes in granular form of the present invention are supplied in conventional kraft paper bags, drums, or pails. Being in granular form, they hardly scatter when unpacked. This contributes to the improvement of working environment and handling performance and increases the yields.

The advantage of being in granular form is that the glass flakes are compressed, made uniform, and improved in flowability. This leads to the prevention of bridging in the hopper and orifice and the improved dispersibility into the matrix resin. Thus the glass flakes in granular form provides reinforced plastics having improved characteristic properties (such as strength).

Being composed of glass flakes and short glass fibers, the glass flake composites A and B of the present invention make it possible to feed two or more than two kinds of reinforcements (such as glass flakes and chopped strands) simultaneously using a single feeder. This leads to the improved molding efficiency and the reduction of raw materials cost and administrative expenses.

The glass flake composite A of the present invention keeps its uniform mixing state because minute glass pieces (glass flakes and short glass fibers) are at least partly bonded to one another with a binder. In other words, glass flakes and chopped strands are kept uniformly mixed despite their difference in bulk density. (Usually, glass flakes have a lower bulk density than chopped strands.) Without bonding, the two components separate from each other on account of the vibrations they receive during transportation and feeding.

In the case of the glass flake composite B of the present invention, it is easy to change the mixing ratio of glass flakes and short glass fibers. For example, it is possible to add glass flakes in granular form or chopped strands to the mixed reinforcement in order to produce a reinforcement of desired formulation.

The glass flake composite B of the present invention keeps its uniform mixing state because the short glass fibers and the glass flakes in granular form have almost the same particle size.

In addition, the glass flake composite B of the present invention has very good flowability because the glass flakes in granular form are readily flowable. For this reason, both of the glass flake composites A and B uniformly disperse into the matrix resin, imparting greatly improved characteristic properties such as strength to the composite material.

Needless to say, both of the glass flake composites A and B of the present invention share the effect of preventing scattering which the glass flakes in granular form produces.

The glass flakes in granular form and the glass flake composites A and B make it possible to produce GFRTP (short glass fiber reinforced thermoplastic resins) in a simple manner. To make GFRTP, they are preblended with thermoplastic resins such as nylon, saturated polyester, polycarbonate, polyacetal, polyphenylene oxide, polyphenylene sulfide, polyvinyl chloride, polystyrene, polypropylene, and polyethylene. The preblend is subsequently melted and mixed in an extruder and injection-molded. The thus obtained molded products have superior characteristic properties on account of uniformly dispersed short glass fibers.

Needless to say, the glass flakes in granular form and the glass flake composites A and B are also useful as a reinforcement for GFRP (short glass fiber reinforced plastics) In this case, they are incorporated into thermosetting resins such as phenolic resin, unsaturated polyester resin, diallyl phthalate resin, and epoxy resin.

The invention is now described in more detail with reference to the following examples and comparative examples, which should not be construed to restrict the scope of the invention.

EXAMPLE 1 and COMPARATIVE EXAMPLE 1

In a 20 liter mixer of rotary disc type was placed 4 kg of glass flakes (CEF-048, a product of Nippon Glass Fiber Co., Ltd.). This product has the c-haracteristic properties shown below. To the glass flakes was added 200 g of binder solution A or 1200 g of binder solution B of the formulation shown below, followed by mixing for 3 minutes. The glass flakes were discharged and dried in a hot-air oven.

| Physical properties of glass flakes (CEF) | |
| --- | --- |
| Composition: E-glass as shown above | |
| Thickness: ca. 3 μm | |
| Particle size: | |
| 10 mesh on | 0 wt % |
| 10~100 mesh on | 85 wt % |
| 100 mesh pass | 15 wt % |
| Binder solution A | |
| Urethane emulsion (50% solids): | 80 wt % |
| Water: | 20 wt % |
| Binder solution B | |
| Urethane: | 20 wt % |
| γ-aminopropyltriethoxysilane (100% solids): | 2 wt % |
| Water: | 78 wt % |

The resulting glass flakes were in the form of granules having an average particle diameter of 1.6 mm in either case. The particle size distribution of the glass flakes in granular form is as follows:

| Particle size distribution of glass flakes in granular form | |
| --- | --- |
| 4.7 mesh on | 0 wt % |
| 4.7~9 mesh on | 13 wt % |
| 9~16 mesh on | 80 wt % |
| 16~24 mesh on | 4 wt % |
| 24~35 mesh on | 2 wt % |
| 35~60 mesh on | 1 wt % |
| 60 mesh pass | 0 wt % |

Figure 2:
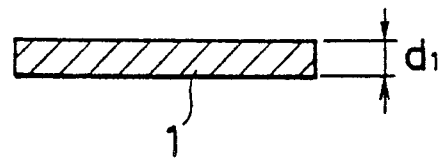
FIG. 2 is a sectional view taken along the line II—II in FIG. 1.

The resulting glass flakes in granular form have a configuration as shown in FIG. 1 which is an enlarged schematic representation. FIG. 2 is a sectional view taken along the line II—II in FIG. 1. The particle I is about 2 mm long ($l_1$), about 1.2 mm wide ($l_2$), and 0.3 mm thick ($d_1$).

The glass flakes in granular form were examined for dustability, uniformity, and compressibility according to the following methods (1), (2), and (3). The results are shown in Table 2. For the purpose of comparison, the glass flakes (600 μm in average particles size) used for granulation were also examined in the same manner. The results are shown in Table 2.

(1) Dustability (%)

This test was conducted using an apparatus made up of a vertical cylinder and a horizontal branch tube extending from the cylinder. The top of the cylinder is the entrance of a sample. The bottom of the cylinder is provided with a dish to receive the falling sample. The horizontal branch tube is connected to a vacuum- pump via a filter. With the vacuum pump on, 10 g of sample is allowed to fall from the upper entrance The amount of the sample collected in the receiving dish depends on the dustability of the sample because scattered sample is drawn out through the branch tube before it reaches the receiving dish. Thus the dustability (%) is calculated from the amount (g) of the sample falling on the receiving dish according to the following formula.

$$\text{Dustability (\%)} = \frac{10 - W}{10} \times 100$$

(2) Uniformity

Uniformity is calculated from the following equation.

$$\text{Uniformity} = \frac{R_1}{R_2}$$

where $R_1$ is the particle diameter for 40% cumulative oversize and $R_2$ is the particle diameter for 90% cumulative oversize. The greater this value, the greater the particle size distribution. In general, as the uniformity value increases, the flowability decreases.

(3) Compressibility (%) (degree of volume reduction)

Compressibility is calculated from the following equation.

$$\text{Compressibility (\%)} = \frac{\rho_y - \rho_x}{\rho_y} \times 100$$

where $\rho_x$ is the bulk density for loose packing and $\rho_y$ is the bulk density for compact packing after tapping.

Compressibility is deeply concerned with the flowability of powder. With a compressibility higher than 20%, powder is poor in flowability and liable to cause bridging.

TABLE 2

| Example | Average particle diameter (μm) | Dustability (%) | Uniformity | Compressibility (%) |
|---|---|---|---|---|
| Example 1 | 1600 | 2 | 2.0 | 12 |
| Comparative Example 1 | 600 | 35 | 4.6 | 43 |

It is noted from Table 2 that the glass flakes in granular form of the present invention are very little subject to scattering and also little subject to bridging on account of the good flowability.

EXAMPLE 2

In a rotary type dryer were placed 1 kg each of glass flakes (CEF-048) and chopped strands (3 mm long, 13 μm in filament diameter, 2 mm in strand diameter, 4,000 filaments per strand, binder quantity: 1 wt % (loss on ignition)). Mixing was effected by turning the dryer for 5 minutes. With the dryer kept turning, the mixture was sprayed with 200 g of epoxy resin emulsion (10% solids), followed by drying. Thus there was obtained glass flake composite A.

One hundred grams of the glass flake composite A was placed in a 500-cc measuring cylinder (5 cm in inside diameter). The cylinder was shaken vertically 50 times. The degree of separation was visually inspected and also quantitatively determined by measuring the amount of chopped strands (CS) contained in the upper 50 g in the cylinder. The results are shown in Table 3.

The glass flake composite A thus obtained was an aggregate of granules (1 to 5 mm in particle size) in which glass flakes and chopped strands are bonded to one another with a binder.

COMPARATIVE EXAMPLE 2

The procedure of Example 1 was repeated to obtain a mixture of glass flakes and chopped strands except that the binder was not used. The resulting product was examined for the degree of separation. The results are shown in Table 3.

It is noted from Table 3 that the glass flake composite A remains in the uniformly mixed state without the separation of chopped strands and glass flakes. It can be mixed with a resin in a desired mixing ratio at the time of use.

TABLE 3

| Example | Example 2 | Comparative Example 2 |
|---|---|---|
| Amount of binder (%) | 2 | 0 |
| Degree of separation: by visual inspection | Good* | Poor* |
| Degree of separation: Amount of CS (wt %) in upper 50 g | 49.8 | 23.5 |

*Good: Glass flakes and chopped strands were in the uniformly mixed state.
*Poor: Chopped strands of high bulk density collected in the lower part of the measuring cylinder.

EXAMPLE 3

Figure 6:
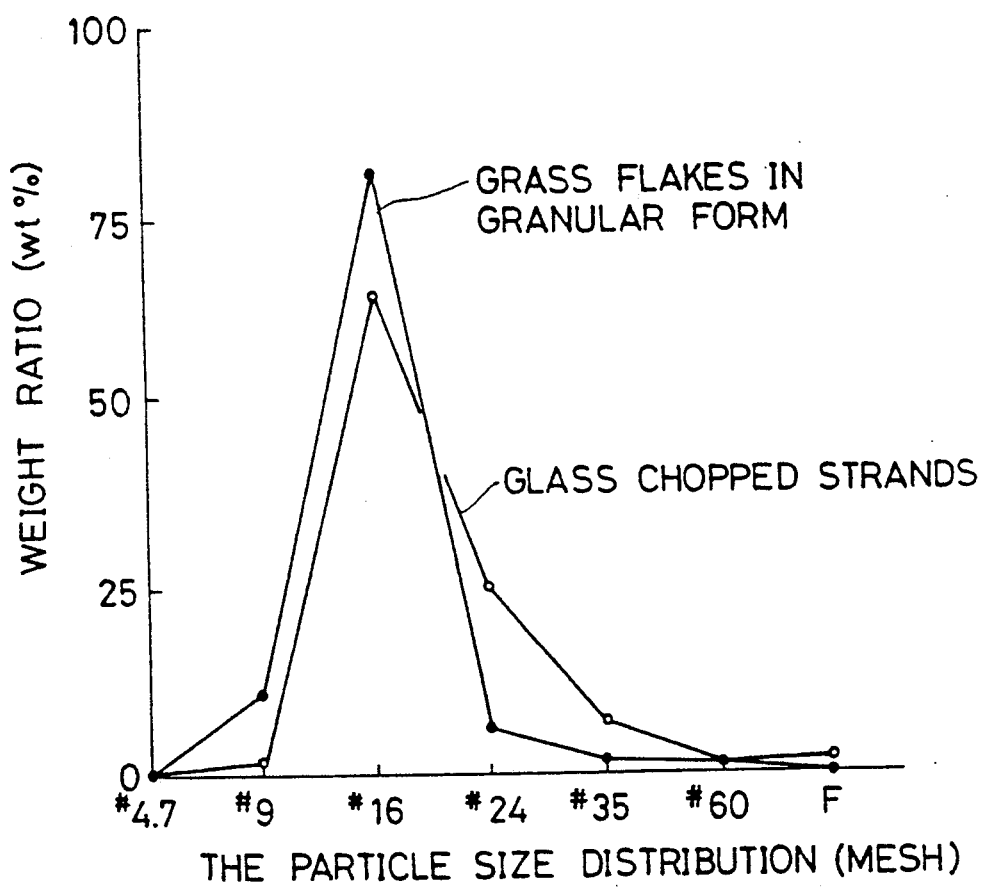
FIG. 6 is a graph showing the particle size distribution of glass flakes in granular form and short glass fibers which are used in Example 3.

In a cylindrical container (180 mm in diameter and 185 mm high) was placed 500 g of glass flakes (CEF-048, a product of Nippon Glass Fiber Co., Ltd.). The glass flakes were sprayed with 150 g of epoxy binder (3.3 wt % solids) (the same one as used for the chopped strands to be mixed). The container was shaken using a shaker (paint mixer) for 10 minutes. The mixed glass flakes were allowed to stand at 120° C for 12 hours, and then dried. Thus there were obtained glass flakes in granular form. Their particle size distribution is shown in FIG. 6.

Figure 3:
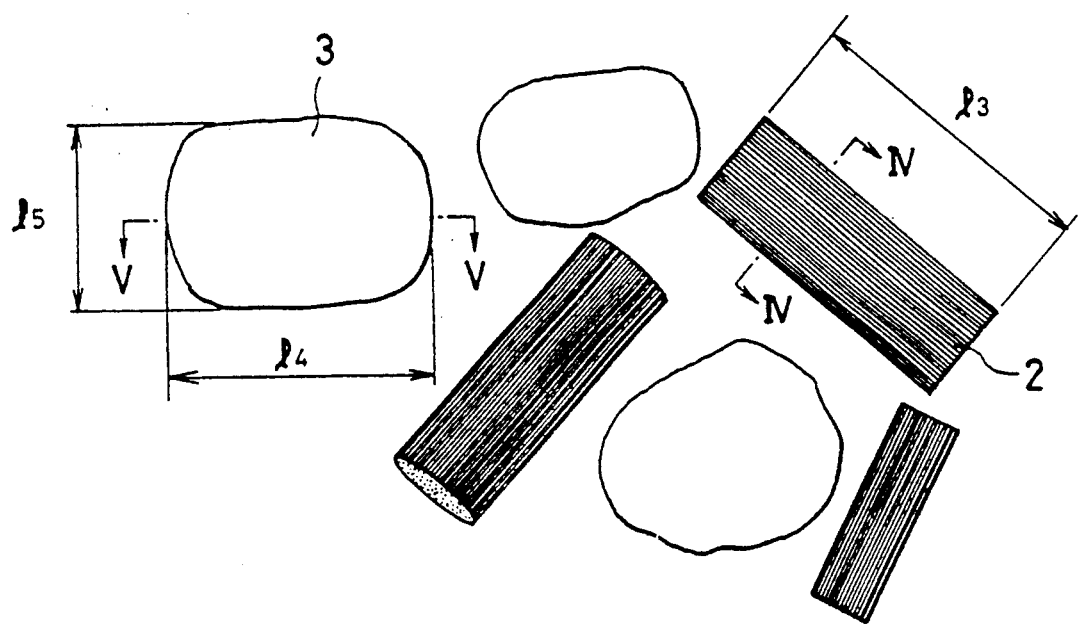
FIG. 3 is an enlarged schematic representation of particles of the glass flake composite B obtained in Example 3.
Figure 4:
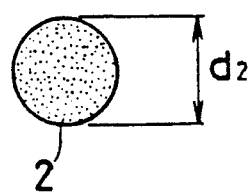
FIG. 4 is a sectional view taken along the line IV—IV in FIG. 3.
Figure 5:
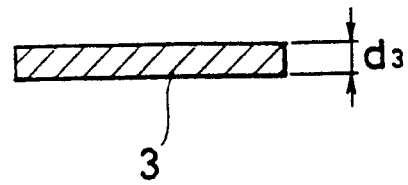
FIG. 5 is a sectional view taken along the line V—V in FIG. 3.

Five hundred grams of the glass flakes in granular form was mixed with 500 g of chopped strands (3 mm long, 13 μm in filament diameter, 2 mm in strand diameter, 4,000 filaments per strand, binder quantity: 1 wt % (loss on ignition)). Mixing was effected by turning for 5 minutes on a tumbler. Thus there was obtained glass flake composite B of the invention. The particles of the resulting glass flake composite B have a configuration as shown in FIG. 3 which is an enlarged schematic representation. FIG. 4 is a sectional view taken along the line IV—IV in FIG. 3. FIG. 5 is a sectional view taken along the line V—V in FIG. 3. The particle 2 of chopped strands is about 3 mm long ($l_3$) and about 1.2 mm in diameter ($d_2$). The granule 3 of glass flakes is about 3 mm long ($l_4$), about 2.2 mm wide ($l_5$) and 0.3 mm thick ($d_3$).

Figure 7:
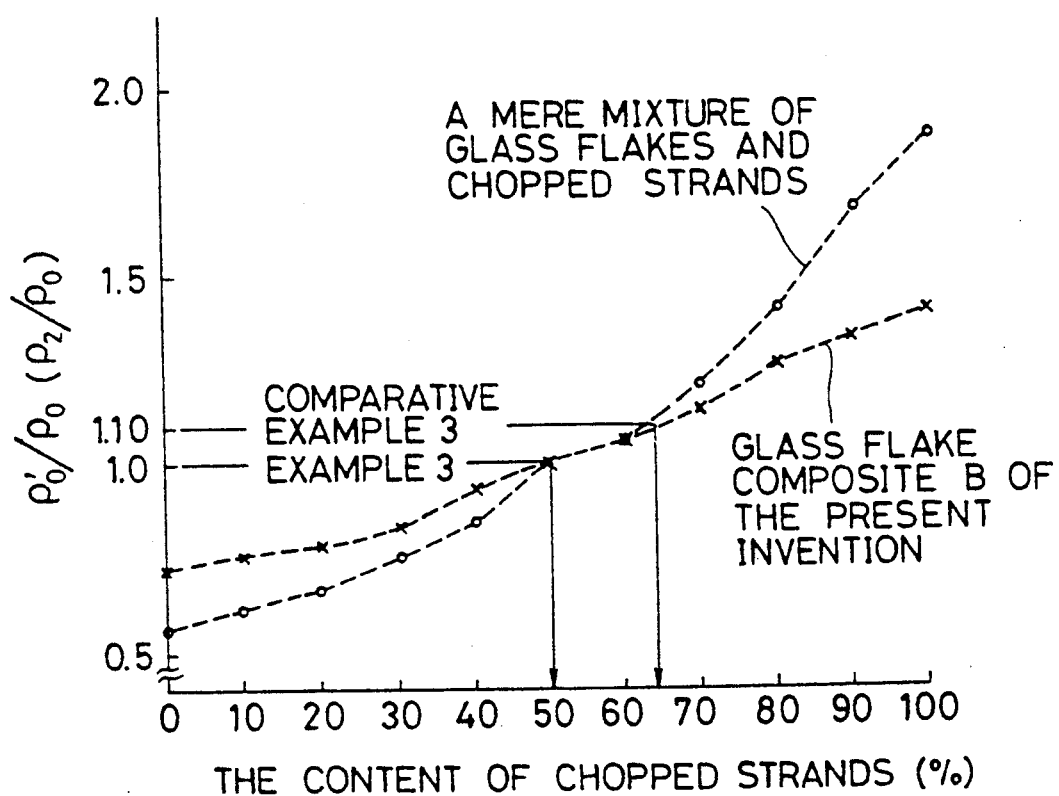
FIG. 7 is a graph showing the working curves prepared in Example 3 and Comparative Example 3.

The thus obtained reinforcement was examined for flowability, dispersibility, and dustability. The results are shown in FIG. 7 and Table 4.

I. Flowability (1) Natural bulk density ($\rho_0$)

In a 500-cc measuring cylinder was placed 50 g of sample, and the volume ($V_0$ cm$^3$) filled with the sample was measured. The natural bulk density ($\rho_0$) was calculated from the following formula. The greater the value of ($\rho_0$), the better the flowability.

$$(\rho_0) = 50/V_0 \ (g/cm^3)$$

(2) Bulk density after vibration ($\rho_1$)

After the measurement of ($\rho_0$), the measuring flask was tapped 50 times so that the sample was packed densely. The volume ($V_1$) of the densely packed sample was measured, and the bulk density ($\rho_1$) was calculated from the following formula. The greater the value of ($\rho_1$), the better the flowability.

$$(\rho_1) = 50/V_1 \ (g/cm^3)$$

(3) Compressibility (C)

This is the degree of the volume reduction that takes place after vibration. It is calculated from the following formula. The lower the value of C, the better the flowability.

$$C = (\rho_1 - \rho_0/\rho_1) \times 100 \ (\%)$$

(4) Flow speed (v)

Ten grams of the sample is caused to flow on a vibration feeder (150 mm wide), and the distance (v mm) over which the sample has moved for 1 minute is measured. The greater the value of v, the better the flowability.

II. Evaluation of tendency toward separation

The glass flake composites containing a varied amount of chopped strands were prepared in the same manner as mentioned above. Their natural bulk density $\rho_0'$ was measured, and the ratio of the natural bulk density ($\rho_0'$) to the natural bulk density ($\rho_0$) obtained in (1) was plotted against the content of chopped strands as shown in FIG. 7. It is noted from FIG. 7 that as the content of chopped strands increases, the natural bulk density increases.

When the glass flake composite is subjected to vibration, granules of glass flakes separate from chopped strands. The degree of separation was quantitatively evaluated in the following manner.

One hundred grams of the sample is caused to flow on a vibration feeder. When 50 of the sample has flowed out, the vibration feeder is suspended and the natural bulk density ($\rho_2$) of the sample which has flowed out is measured. The ratio of $\rho_2/\rho_0$ is calculated and the content (R) of chopped strands in the sample which has flowed out is obtained from the working curve shown in FIG. 7. The degree of separation is calculated from the following equation.

$$\text{Degree of separation} = \frac{R - 50}{50} \times 100 (\%)$$

If the degree of separation is 0, it means that no separation takes place at all between the chopped strands and glass flakes in granular form. If the degree of separation is 100, it means that two components separate completely from each other.

III. Evaluation of dustability (%)

This is performed in the same manner as in (1) in Example 1.

COMPARATIVE EXAMPLE 3

The procedure of Example 1 was repeated to obtain a mixture of glass flakes and chopped strands except that the granulation step was not carried out. The resulting product was examined for flowability, separation, and dustability. The results are shown in Table 4.

For the evaluation of separation, a working curve was obtained from mere mixtures of glass flakes and chopped strands.

TABLE 4

|  |  | Example 3 | Comparative Example 3 |
| --- | --- | --- | --- |
| Flowability | Natural bulk density $\rho_0$ (g/cm$^3$) | 0.400 | 0.294 |
|  | Bulk density after vibration $\rho_1$ (g/cm$^3$) | 0.465 | 0.488 |
|  | Compressibility C (%) | 14.0 | 39.8 |
|  | Flow rate v (mm/min) | 704 | 420 |
| Separation | Natural bulk density after 50 g has flowed out. $\rho_2$ (g/cm$^3$) | 0.400 | 0.323 |
|  | Degree of separation (%) | 0 | 28 |
| Dustability (%) |  | 1 | 18 |

It is noted from Table 4 and FIG. 7 that the glass flake composite B of the present invention is better in flowability than a mere mixture of glass flakes and chopped strands. In addition, it remains unseparated and is kept in the uniformly mixed state even after it has been subjected to vibration, and it prevents glass flakes from scattering.

What is claimed is:

1. A glass flake composite, comprising,
   short glass fibers made of chopped strands, each chopped strand having a cut length of 0.5 to 25 mm, and
   glass flakes in granular form mixed with the short glass fibers in a ratio of 1:99 to 99:1, said glass flakes in the granular form having diameter under 5 mm with approximately the same particle size as said short glass fibers and being formed by bonding glass flakes with a binder, an amount of said binder being 0.2 to 10 parts by weight relative to 100 parts by weight of the glass flakes, each glass flake having an average thickness of 0.5 to 7.0 micron, an average particle diameter of 5 to 1,000 microns and an aspect ratio of 2 to 1,000, said binder bonding the glass flakes together so that each granule of the glass flakes includes tens to thousands of glass flakes laminating one after another to be parallel to each other.

2. A glass flake composite according to claim 1, wherein each chopped strand has a diameter under 3 mm.

3. A glass flake composite as claimed in claim 1, wherein the mixing ratio of glass flakes and short glass fibers is 20:80 to 80:20 by weight.

4. A glass flake composite as claimed in claim 1, wherein the binder is a thermoplastic resin.

5. A glass flake composite as claimed in claim 1, wherein the binder contains a coupling agent.

6. A glass flake composite as claimed in claim 1, wherein the chopped strands have such a particle diameter that the fraction of 9 to 24 mesh accounts for 50 wt %.

7. A glass flake composite as claimed in claim 1, wherein the chopped strands have a cut length of 0.5 to 3 mm and a strand diameter of 1 to 3 mm, said chopped strands being produced from glass strands each composed of 400 to 5,000 filaments each having a diameter of 6 to 15 $\mu$m.

8. A glass flake composite as claimed in claim 1, which is produced by spraying a mixture of free-flowing glass flakes and short glass fibers with a binder solution, followed by mixing and drying.

9. A glass flake composite, comprising,
short glass fibers made of chopped strands, each chopped strand having a cut length of 0.5 to 25 mm and a diameter under 3 mm, and
glass flakes in granular form mixed with the short glass fibers in a ratio of 1:99 to 99:1, each granule of said glass flakes having diameter under 5 mm with approximately the same particle size as said short glass fibers and being made of glass flakes and a binder for bonding the glass flakes, each glass flake having an average thickness of 0.5 to 7.0 micron, an average particle diameter of 5 to 1,000 microns and an aspect ratio of 2 to 1,000, said binder bonding the glass flakes together so that each granule of the glass flakes includes tens of thousands of glass flakes laminating one after another to be parallel to each other, said binder being soluble to a synthetic resin and added to the glass flakes between 0.2 and 10 parts by weight relative to 100 parts by weight of the glass flakes, said granules of the glass flakes, when mixed with the synthetic resin in use, separating into the glass flakes to disperse into the synthetic resin, the glass flakes thoroughly mixing with the synthetic resin to improve strength of the synthetic resin without dispersing in the air when mixed together.

10. A glass flake composite according to claim 9, wherein said glass flake composite is mixed with a synthetic resin for reinforcing the same.

* * * * *